United States Patent
Nakajima et al.

(10) Patent No.: US 7,719,570 B2
(45) Date of Patent: May 18, 2010

(54) DIGITAL CAMERA, PRINT SYSTEM, AND DATA STRUCTURE

(75) Inventors: Yasumasa Nakajima, Nagano (JP); Eiji Tsubono, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1015 days.

(21) Appl. No.: 11/127,310

(22) Filed: May 12, 2005

(65) Prior Publication Data

US 2005/0273710 A1    Dec. 8, 2005

Related U.S. Application Data

(63) Continuation of application No. PCT/JP03/14338, filed on Nov. 11, 2003.

(30) Foreign Application Priority Data

Nov. 12, 2002  (JP) ............................ P2002-328620

(51) Int. Cl.
  H04N 5/225  (2006.01)
  G06F 17/00  (2006.01)
(52) U.S. Cl. .................................... 348/207.2; 715/210
(58) Field of Classification Search ............. 348/207.2, 348/231.2, 231.3; 358/1.15; 382/305; 715/202, 715/249
See application file for complete search history.

(56) References Cited

U.S. PATENT DOCUMENTS

| | | | |
|---|---|---|---|
| 5,838,317 A * | 11/1998 | Bolnick et al. .............. | 715/764 |
| 6,867,882 B1 * | 3/2005 | Takahashi ................... | 358/1.6 |
| 2001/0019359 A1 * | 9/2001 | Parulski et al. .............. | 348/207 |
| 2004/0028290 A1 * | 2/2004 | Gamble ...................... | 382/284 |

FOREIGN PATENT DOCUMENTS

| EP | 0-853 426 A2 | 7/1998 |
|---|---|---|
| JP | 8-256256 A | 10/1996 |
| JP | 11-168689 A | 6/1999 |
| JP | 11-196362 A | 7/1999 |
| JP | 11-298764 A | 10/1999 |
| JP | 2001-045352 A | 2/2001 |
| JP | 2001-127986 A | 5/2001 |
| JP | 2002-044416 A | 2/2002 |
| JP | 2002-103747 A | 4/2002 |

OTHER PUBLICATIONS

Gamble, William; U.S. Appl. No. 60/401,366, filed Aug. 5, 2002.*
Gamble, William, U.S. Appl. No. 60/401,366 "Composite Image Layout System, Method and Program Product" Aug. 5, 2002.*

* cited by examiner

Primary Examiner—Tuan Ho
Assistant Examiner—Leslie Virany
(74) Attorney, Agent, or Firm—Sughrue Mion, PLLC

(57) ABSTRACT

A digital camera includes: an optical system for forming an optical image of a subject; an image pickup unit that converts the formed optical image of the subject and outputs a subject image; and a recording unit that associates the subject image output by the image pickup unit with a layout definition data group and stores the subject image in a nonvolatile memory. The layout definition data group is stored in the nonvolatile memory and is made up of pieces of layout definition data that define a layout to draw a subject image for a drawing medium of a specific size. The pieces of layout definition data making up the layout definition data group with which the subject image is associated defines similar layouts for drawing media of difference sizes.

5 Claims, 15 Drawing Sheets

FIG. 7

[HEADER]
HdFilename="daen0000.usd"
HdFilename="daen0001.usd"
HdFilename="daen0002.usd"

*FIG. 8*

```
[HEADER]
Hdusm="daen_0.usm"
```

FIG. 10

| | | PRINT JOB | | | |
|---|---|---|---|---|---|
| PRINT AT PHOTOGRAPHING TIME | FRAME PROCESSING | PRINT MODE | PRINT SIZE | PATH INFORMATION OF SUBJECT IMAGE | NUMBER OF PRINT SHEETS |
| EXECUTED | NOT EXECUTED | FINE | L-FORMAT CUT SHEET | 0001.jpg | TWO |

FIG. 15

| PRINT COMMAND | | | | | | |
|---|---|---|---|---|---|---|
| PRINT AT PHOTOGRAPHING TIME | FRAME PROCESSING | PRINT MODE | PRINT SIZE | PATH INFORMATION OF SUBJECT IMAGE | NUMBER OF PRINT SHEETS | PATH INFORMATION OF LAYOUT DEFINITION DATA |
| EXECUTED | NOT EXECUTED | FINE | L-FORMAT CUT SHEET | 0001.jpg | TWO | daen0001.usd |

DIGITAL CAMERA, PRINT SYSTEM, AND DATA STRUCTURE

This application is a continuation application of International Application No. PCT/JP03/14338, filed Nov. 11, 2003, claiming priority of Japanese Application No. 2002-328620 filed on Nov. 12, 2002.

BACKGROUND OF THE INVENTION

This invention relates to a digital camera, a print system, and a data structure.

A digital camera has a use of recording data as material of a composite image, for example. The composite image is widely used to print a greeting card with a photo, a framed photo seal, etc. With a digital camera disclosed in JP-A-2001-45352, a still image (default image) to be combined with an image representing a subject (subject image) is selected at the photographing time and when a shutter switch is pressed, composite image data provided by combining the subject image and the default image is stored in external storage means. According to the digital camera in JP-A-2001-45352, as a default image is selected at the photographing time, a composite image responsive to the purpose of a greeting card with a photo, a framed photo seal, etc., can be stored and can be drawn on a drawing medium. According to the digital camera in patent document 1, as a composite image is scaled up or down, it can be drawn on drawing media different in size, so that the size of the drawing medium for drawing the composite image is not specified.

However, since the composite image is stored with the digital camera in the related art, later only the subject image cannot be printed and the subject image cannot be combined with a different default image; this is a problem. Specifically, with the digital camera in the related art, only the composite image is stored and the subject image is not stored. Therefore, if the user wants to print only the subject image after photographing, the subject image cannot be printed. Thus, the subject image cannot be combined with another default image for print either. For example, to print a greeting card with a photo, if the user wants to change the default image selected at the photographing time to another default image, the user must again take a photograph from the beginning.

SUMMARY OF THE INVENTION

It is an object of the invention to provide a digital camera capable of storing a subject image so that a default image to be combined with the subject image can be changed after the subject image is photographed, and that the size of a drawing medium to draw the composite image provided by combining the default image with the subject image can be selected after the subject image is photographed.

It is another object of the invention to provide a print system wherein a default image to be combined with a subject image can be changed after the subject image is photographed, and the size of a drawing medium to draw the composite image provided by combining the default image with the subject image can be selected after the subject image is photographed.

It is another object of the invention to provide a data structure wherein a default image to be combined with a subject image can be changed after the subject image is photographed, and the size of a drawing medium to draw the composite image provided by combining the default image with the subject image can be selected after the subject image is photographed.

In order to solve the aforesaid object, the invention is characterized by having the following arrangement.

(1) A digital camera comprising:

an optical system for forming an optical image of a subject;

an image pickup unit that converts the formed optical image of the subject and outputs a subject image; and a recording unit that associates the subject image output by the image pickup unit with a layout definition data group and stores the subject image in a nonvolatile memory, wherein the layout definition data group is stored in the nonvolatile memory and is made up of pieces of layout definition data that define a layout to draw a subject image for a drawing medium of a specific size, and wherein the pieces of layout definition data making up the layout definition data group with which the subject image is associated defines similar layouts for drawing media of difference sizes.

(2) The digital camera according to (1), wherein the recording unit associates the subject image with a first associating file describing information to specify each of pieces of the layout definition data making up the same layout definition data group, thereby associating the subject image with the layout definition data group.

(3) The digital camera according to (2), wherein the recording unit stores a second associating file describing information to specify the first associating file in the nonvolatile memory and associates the subject image with the second associating file, thereby associating the subject image with the first associating file.

(4) The digital camera according to (3), wherein the recording unit includes an identical character string in a filename of the subject image and a filename of the second associating file, thereby associating the subject image with the second associating file.

(5) The digital camera according to (1), wherein a filename of the layout definition data includes a character string from which the size of a drawing medium to which the layout definition data is applied can be determined.

(6) The digital camera according to (2), further comprising a layout selection unit that selects a layout definition data group to be associated with a subject image, wherein the layout selection unit causes the first associating file to be selected, thereby causing the layout definition data group to be selected, wherein the recording unit associates the subject image with the first associating file selected through the layout selection unit and stores the subject image.

(7) A print system comprising:

an optical system that forms an optical image of a subject;

an image pickup unit that converts the formed optical image of the subject and outputs a subject image;

a recording unit that associates the subject image output by the image pickup unit with a layout definition data group and stores the subject image in a nonvolatile memory;

wherein the layout definition data group is stored in the nonvolatile memory and is made up of pieces of layout definition data that define a layout to draw a subject image for a drawing medium of a specific size, wherein the pieces of layout definition data making up the layout definition data group with which the subject image is associated defines similar layouts for drawing media of difference sizes, a print unit that prints a subject image based on layout definition data;

a print setting unit that sets a print job for causing the print unit to print the subject image stored in the nonvolatile memory, wherein the print setting unit is provided with a size selection unit that selects the size of a drawing medium to print the subject image from among sizes to which the pieces of layout definition data making up the layout definition data group associated with the subject image are applied; and a print control unit that causes the print unit to print the subject image stored in the nonvolatile memory based on the print job, wherein the print control unit, based on the layout definition data applied to the size set in the print job among the layout definition data pieces making up the layout definition data group associated with the subject image, causes the print unit to print the subject image on a drawing medium of the setup size.

(8) A data structure of a layout definition data group made up of pieces of layout definition data defining a layout to draw a subject image, the data structure comprising:

a plurality of pieces of layout definition data; and a first associating file describing information to specify the pieces of layout definition data making up the same layout definition data group, and wherein a plurality of pieces of layout definition data making up the same layout definition data group define similar layouts for drawing media of different sizes.

The functions of the plurality of elements included in the invention are provided by hardware resources whose functions are determined by the configuration, hardware resources whose functions are determined by programs, or a combination thereof. The functions of the plurality of means are not limited to those provided by hardware resources physically independent of each other.

BRIEF DESCRIPTION OF THE DRAWINGS

FIG. 7 is a drawing to show the description contents of a first associating file according to the invention.

FIG. 8 is a drawing to show the description contents of a first associating file according to the invention.

FIG. 10 is a schematic drawing to describe a print job according to the invention.

FIG. 15 is a schematic drawing to describe a print command according to the invention.

DETAILED DESCRIPTION OF PREFERRED EMBODIMENTS

An embodiment of the invention will be discussed based on a plurality of drawings.

Figure 2:
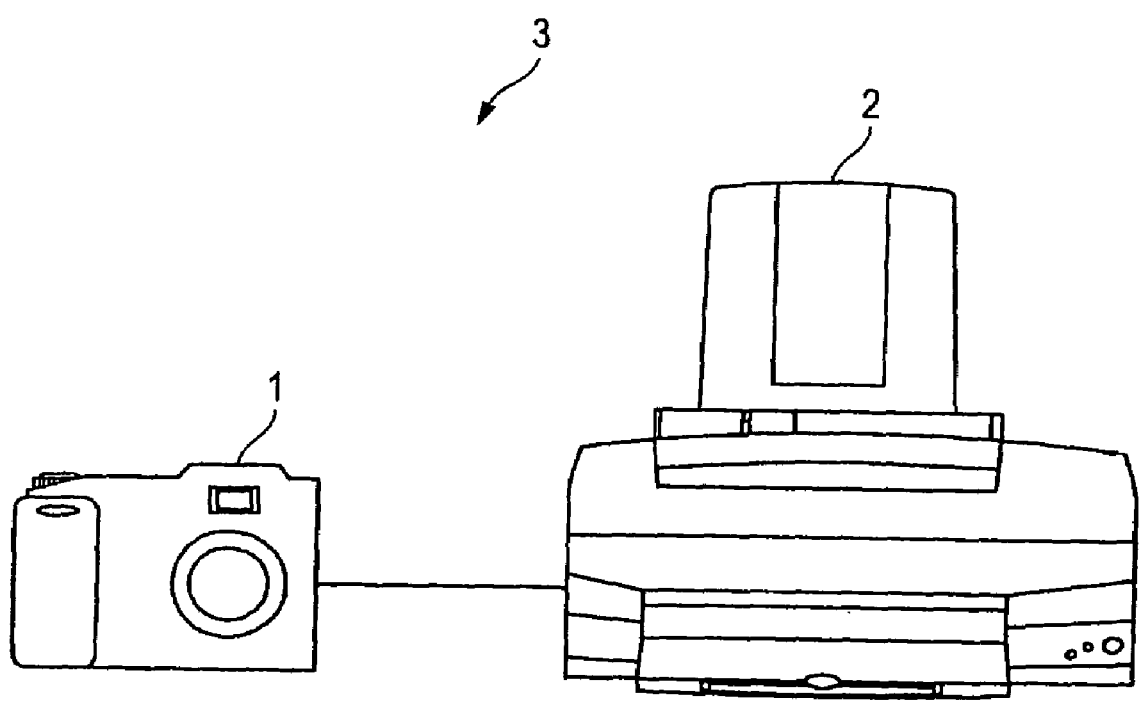
FIG. 2 is a schematic drawing to show a digital camera and a print system according to the invention.

FIG. 2 is a schematic drawing to show a digital still camera 1 as a digital camera according to one embodiment of the invention and a print system 3 made up of the digital still camera 1 and a printer 2 as print means.

When a print command described later is output from the digital still camera 1, the printer 2 prints a subject image based on the print command. Specifically, when a print command is output, the printer 2 interprets layout definition data set in the print command, and prints the subject image on a drawing medium of the size set in the print command based on the layout defined in the layout definition data according to an ink jet system, a laser system, a sublimation dye transfer printing system, a dot impact system, etc., for example.

Figure 3:
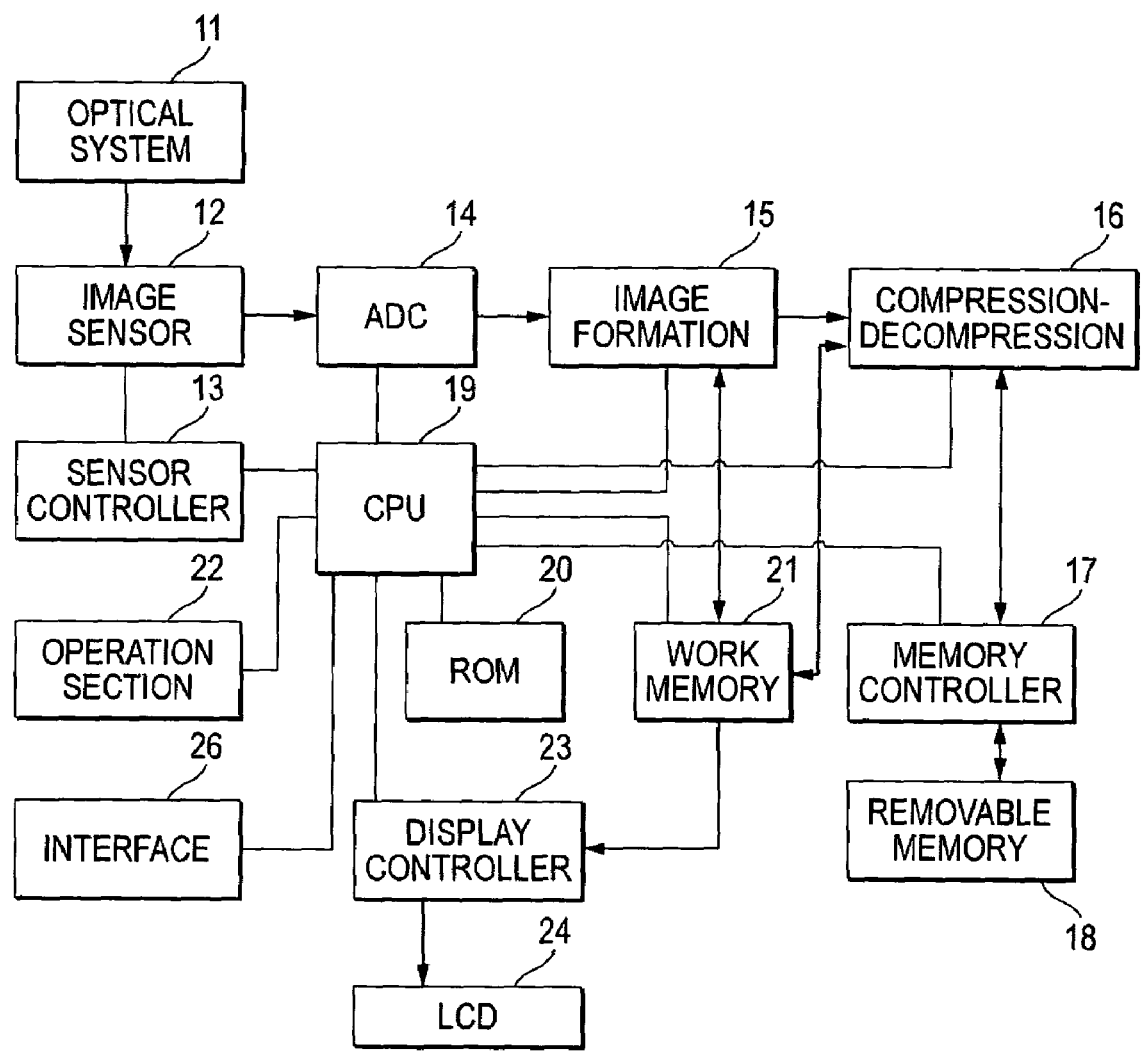
FIG. 3 is a block diagram to show the configuration of the digital camera according to the invention.
Figure 4A:
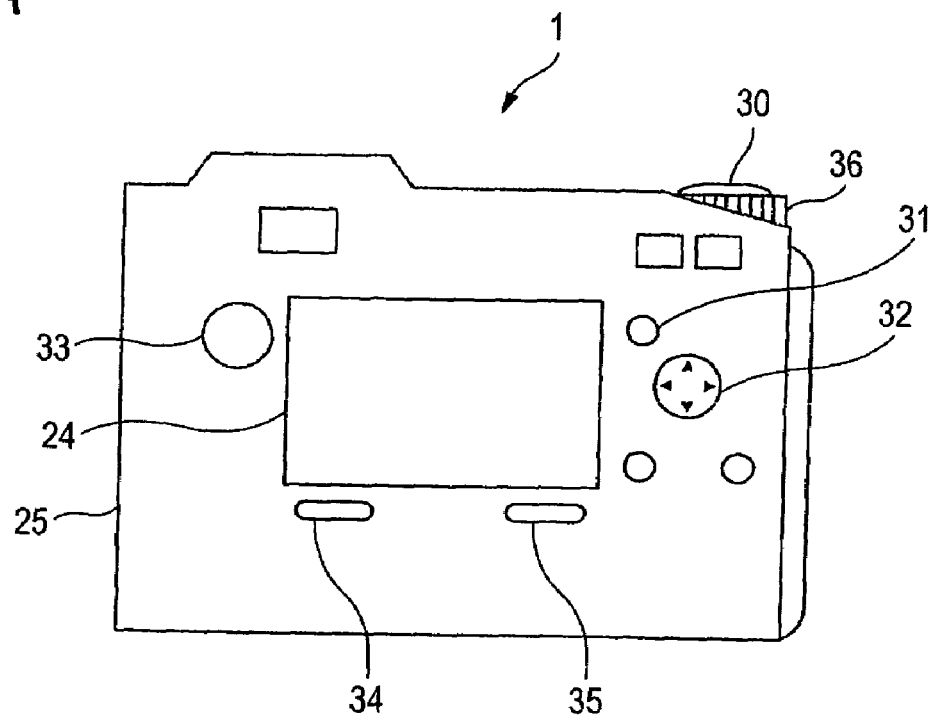
FIG. 4A is a rear view of the digital camera and FIG. 4B is a front view of the digital camera according to the invention.
Figure 4B:
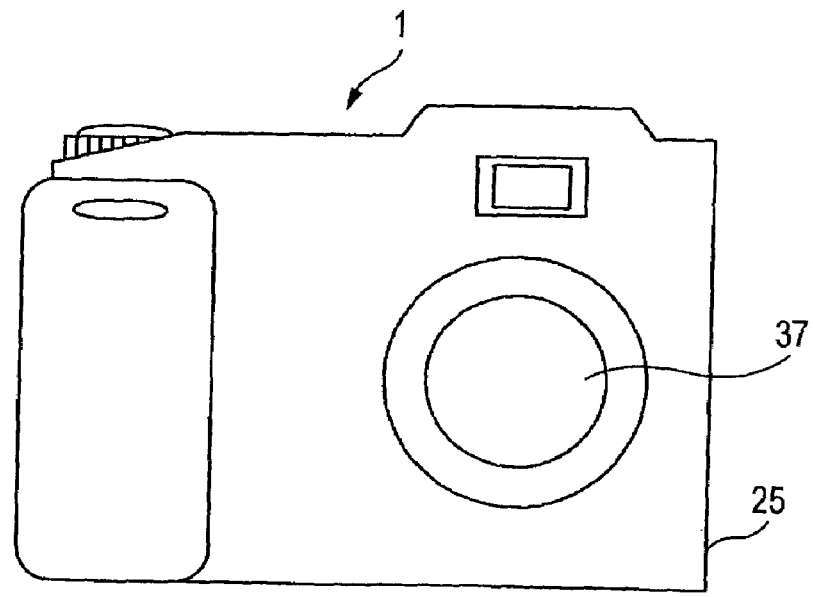

FIG. 3 is a block diagram to show the configuration of the digital still camera 1. FIGS. 4A and 4B are a rear view and a front view to show the appearance of the digital still camera 1.

An optical system 11 is made up of a lens 37, an aperture, etc., housed in a cabinet 25. The optical system 11 forms an optical image of a subject on the light reception face of an image sensor 12.

The image sensor 12 as image pickup means is an area image sensor including photoelectric conversion elements discretely placed in a two-dimensional space and charge transfer devices such as CCD (Charge Coupled Device). The image sensor 12 is driven by a sensor controller 13. The image sensor 12 stores the charges provided by executing photoelectric conversion for a given time for each photoelectric conversion element and outputs an electric signal responsive to the light reception amount for each photoelectric conversion element. Four complementary color filters of C (Cyan), M (Magenta), Y (Yellow), and G (Green) or primary color filters of R (Red), G (green), and B (Blue) are provided on the light reception face, whereby it is made possible to form a color image.

An A/D conversion section (ADC) 14 as image pickup means quantizes an analog signal output from the image sensor 12 for conversion to a digital signal. Specifically, for example, the ADC 14 performs reduction processing of noise contained in the analog signal, level adjustment processing of the analog signal by gain control, quantization processing, etc.

An image formation section 15 as image pickup means performs image formation processing, white balance correction, γ correction, color space conversion, etc., for the digital signal output from the ADC 14, and outputs image data representing R, G, and B gradation values, Y, Cb, and Cr gradation values, etc., for each pixel. The image formation processing mentioned here is processing of interpolating a pixel made of one-color density information by different-color density information of a nearby pixel, thereby outputting digital image data having three gradation values of R, G, and B or Y, Cb, and Cr for each pixel.

A compression-decompression section 16 as image pickup means compresses or decompresses digital image data. Specifically, it performs sequential conversion and entropy coding of digital image data, thereby compressing the digital image data and performs inverse conversion of the compressed digital image data, thereby decompressing the digital image data. Specifically, for example, the compression-decompression section compresses the digital image data using discrete cosine transform, wavelet transform, run length coding, Huffman coding, etc. The digital image data after being compressed is output to a memory controller 17 as the subject image.

The memory controller 17 as record means stores the subject image compressed by the compression-decompression section 16 in removable memory 18 as nonvolatile memory.

An operation section 22 includes a dial switch 36, pushbutton switches 31, 33, 34, and 35, across key 32, a shutter switch 30, etc. The dial switch 36 is a dial switch for setting a mode such as a photographing mode or a print mode in response to the rotation angle of the switch. The pushbutton switch 31 is a switch for calling a menu on an LCD (Liquid Crystal Display) 24. The pushbutton switches 34 and 35 and the cross key 32 are switches for operating a menu displayed on the LCD 24. The pushbutton switch 33 is a switch for entering a print command. The shutter switch 30 is a switch for entering a still image record command. In the photographing mode, the user can enter a still image record command by pressing the shutter switch 30.

The LCD 24 functions as an electronic view finder in the photographing mode. A display controller 23 includes a frame buffer for storing digital image data of one screen of the LCD 24 and a display circuit for driving the LCD 24 based on the digital image data stored in the frame buffer. In the photographing mode, a digital moving image representing a subject, a digital still image representing the whole or a part of an image to be combined with a still image representing a subject, α channel to combine the two images, and an object forming a menu are stored in the frame buffer. The display circuit combines the objects stored in the frame buffer into one for display on the LCD 24.

An interface section 26 is implemented in conformity with the USB (Universal Serial Bus) standard, for example. To transmit data, one connector of a USB cable is inserted into a USB port of the interface section 26 and an opposite connector is inserted into a USB port of the printer 2, whereby the digital still camera 1 and the printer 2 are connected so that they can communicate with each other.

The CPU 19 controls the whole digital still camera 1 by executing a computer program stored in ROM 20. Work memory 21 is memory for temporarily storing a program and data. The program and various pieces of data stored in the ROM 20 may be downloaded through a network from a predetermined server for storage in the ROM 20 or may be read from a computer-readable storage medium such as the removable memory 18 for storage in the ROM 20.

Figure 1:
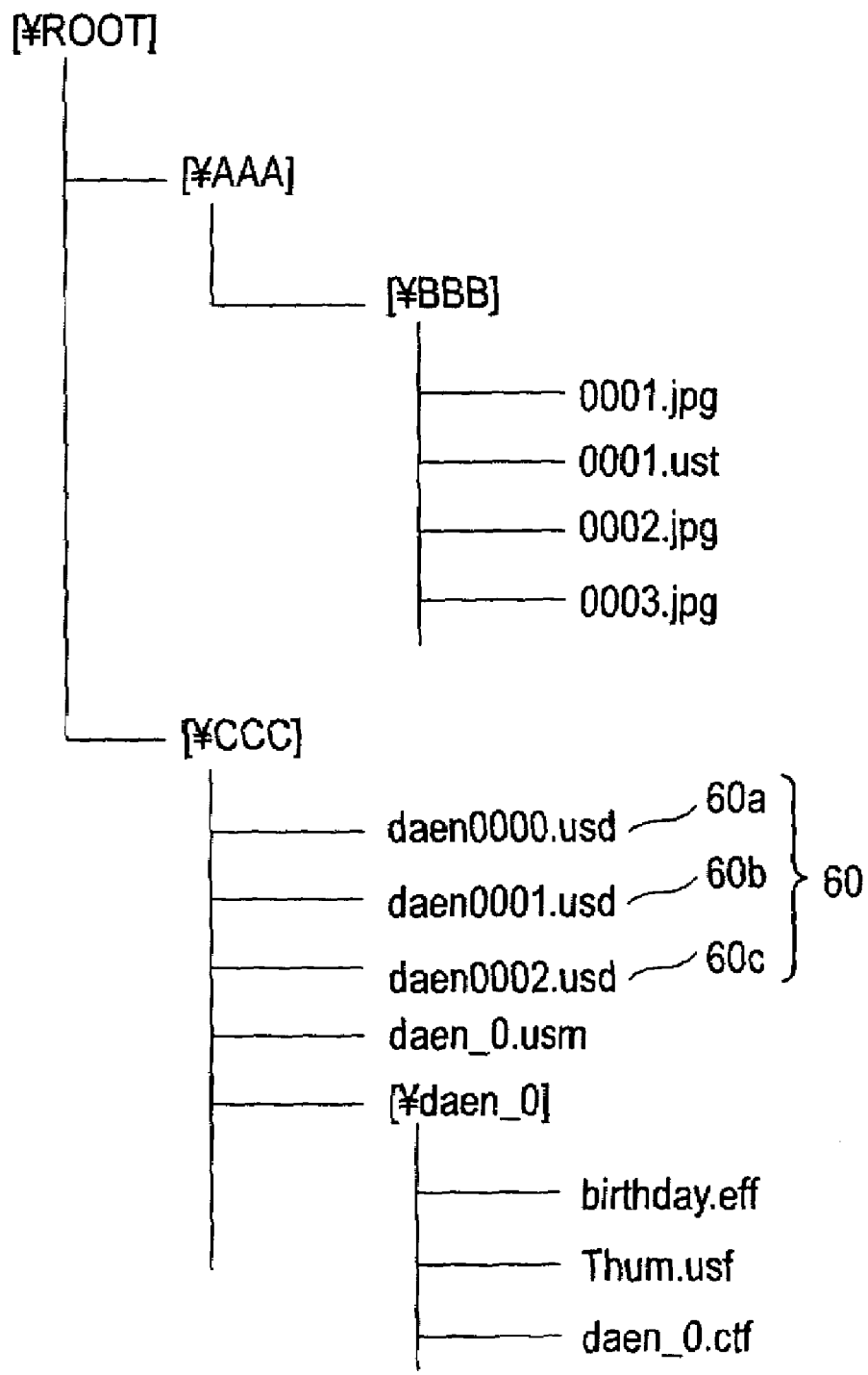
FIG. 1 is a schematic drawing to show the data structure of a layout definition data group according to the invention.

FIG. 1 is a schematic drawing to show directories of files stored in the removable memory 18. The layout definition data defining the layout to draw a subject image for a drawing medium of a specific size is stored as a separate file from a digital still image representing a subject (subject image). A first associating file describing information to specify the pieces of layout definition data making up the same layout definition data group and a second associating file describing information to specify the first associating file are further stored as separate files.

A file with extension ".jpg" contains a subject image.

A file with extension ".usd" contains layout definition data. The layout definition data is retained for each size of drawing media. In FIG. 1, it is assumed that daen0000.usd 60a, daen0001.usd 60b, and daen0002.usd 60c make up the same layout definition data group 60 and that the three layout definition data pieces define the layouts for the drawing media of "A4," "L-format cut sheet," and "postcard" different in size. The eighth character of each filename from the left thereof is a character indicating the size of the drawing medium to which the layout definition data is applied. Specifically, "0" indicates "A4," "1" indicates "L-format cut sheet," and "2" indicates "postcard." Therefore, for example, it can be recognized that "daen0000.usd" is layout definition data defining the layout for "A4" from the character string included in the filename. If the filename includes the character string from which the size can be determined, the processing amount required for determining the size can be decreased as compared with the case where size information is described in the layout definition data. The three layout definition data pieces making up the same layout definition data group define the layouts having similitude relation. Here, the similitude relation will be discussed. When the layout defined by one layout definition data piece is scaled up or down, if it matches the layout defined by a different layout definition data piece, it is said that the layout defined by the one layout definition data piece and the layout defined by the different layout definition data piece have similitude relation. At this time, the layout may be scaled up or down in the same ratio between the length and the width or a different ratio. If a subject image is to be associated with layout definition data, the subject image is to be superposed on what position of the default image and is to be drawn at what position of the drawing medium, namely, the layout for drawing the subject image can be flexibly defined as compared with the case where the subject image is simply associated with the default image. The layout definition data is described later in detail.

A file with extension ".usm" is a first associating file. If a subject image is associated with the first associating file, the subject image need not be associated with each of the pieces of layout definition data making up the same layout definition data group and the processing amount required for associating can be decreased.

A file with extension ".ust" is a second associating file. The second associating file is given a filename including the same character string as the filename of the subject image to be associated with the layout definition data group specified in the first associating file specified in the second associating file. Accordingly, the subject image is associated with the second associating file. Therefore, in the example in FIG. 1, subject image 0001.jpg is associated with second associating file 0001.ust. If the subject image is associated with the second associating file, a plurality of subject images can share the same first associating file. Therefore, the need for duplicately storing the first associating file relative to the same layout definition data group is eliminated and the capacity of the removable memory 18 can be saved. Which subject image and which second associating file are associated with each other can be determined from the filenames, so that the processing amount required for determining of associating can be decreased as compared with the case where information of associating is described in the second associating file.

A file with extension ".eff" contains a digital still image (default image) to be combined with a subject image based on the layout definition data.

A file with extension ".usf" contains a playback apparatus thumbnail. The playback apparatus thumbnail is a thumbnail image file for drawing the layout defined in the layout definition data on a playback apparatus such as a printer or a personal computer.

A file with extension ".ctf" contains a camera thumbnail. The camera thumbnail is a thumbnail image file for displaying the layout defined in the layout definition data as an image on the LCD 24 of the digital still camera 1. The camera thumbnail is described later in detail. The default image, the playback apparatus thumbnail, and the camera thumbnail are stored in the folder of the same name as the filename of the first associating file describing the information to specify the layout definition data defining the layout displayed by the playback apparatus thumbnail and the camera thumbnail. That is, the camera thumbnail and the first associating file are associated with each other by the name of the folder in which the camera thumbnail is stored.

Figure 5:
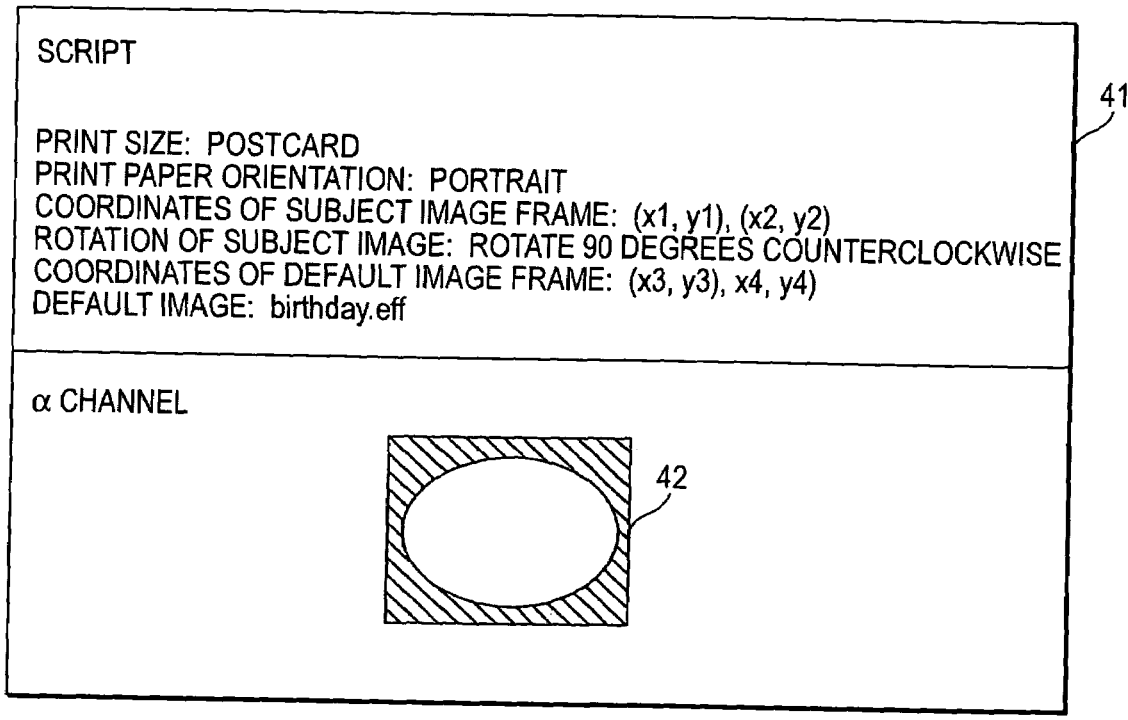
FIG. 5 is a schematic drawing to show the descriptions of the layout definition data according to the invention.
Figure 6A:
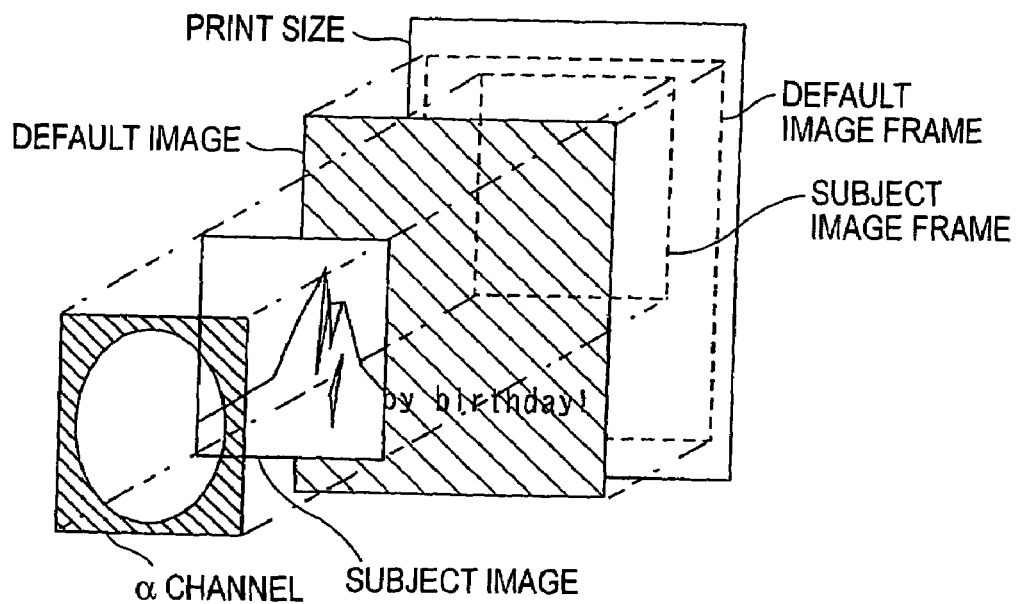
FIG. 6A is a schematic drawing to describe drawing using layout definition data and FIG. 6B is a plan view to show the result of the drawing using the layout definition data according to the invention.
Figure 6B:
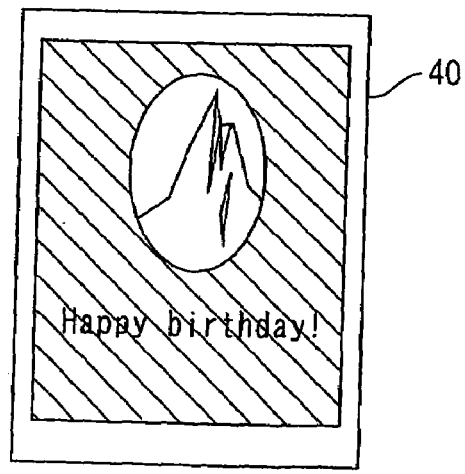

FIG. 5 is a schematic drawing to show the descriptions of layout definition data 41. FIG. 6(A) is a schematic drawing to describe a composite image drawn using the layout definition data 41. FIG. 6(B) is a plan view to show a postcard 40 as a drawing medium drawing the composite image drawn using the layout definition data 41. The layout of the subject image is defined in the layout definition data 41 by a script. The script defines the drawing position of the subject image, the drawing position of the default image, information to specify the default image, etc., so that they can be interpreted uniquely in a printer, etc. Specifically, for example, the script defines the paper size (for example, "postcard"), information to define the drawing medium orientation (for example, "portrait"), information to define the subject image frame as the drawing position of the subject image (for example, upper right coordinates of the frame "(x1, y1)" and lower left coordinates of the frame "(x2, y2)"), information to define rotation when the subject image is placed in the frame (for example, "rotate 90 degrees counterclockwise"), information to determine the image to be combined with the subject image (default image) (for example, "birthday.eff" as the path information of the default image), information to define the default image frame as the drawing position of the default image (for example, upper right coordinates of the frame "(x3, y3)" and lower left coordinates of the frame "(x4, y4)"), etc. The subject image and the default image are combined based on the layout definition data, whereby a composite image applied to a drawing medium of the specific size is created.

An α channel 42 may be stored in the layout definition data 41. The α channel is information defining pixels of which of two images to reflect on the composite image for each pixel when the two images are superposed.

FIG. 7 is a schematic drawing to show the description contents of daen_0.usm as a first associating file. In the figure, "HdFilename=" represents a line on which information to specify layout definition data is described, followed by description of the path information of the layout definition data as the information to specify layout definition data. The path information is information that can specify the layout definition data uniquely; for example, if the layout definition data can be uniquely specified solely by the filename, only the file name may be used as the path information or if the layout definition data having the same filename is stored in a different directory and the layout definition data cannot be specified solely by the filename, the information to specify the directory and the filename may be used as the path information.

Figure 8:
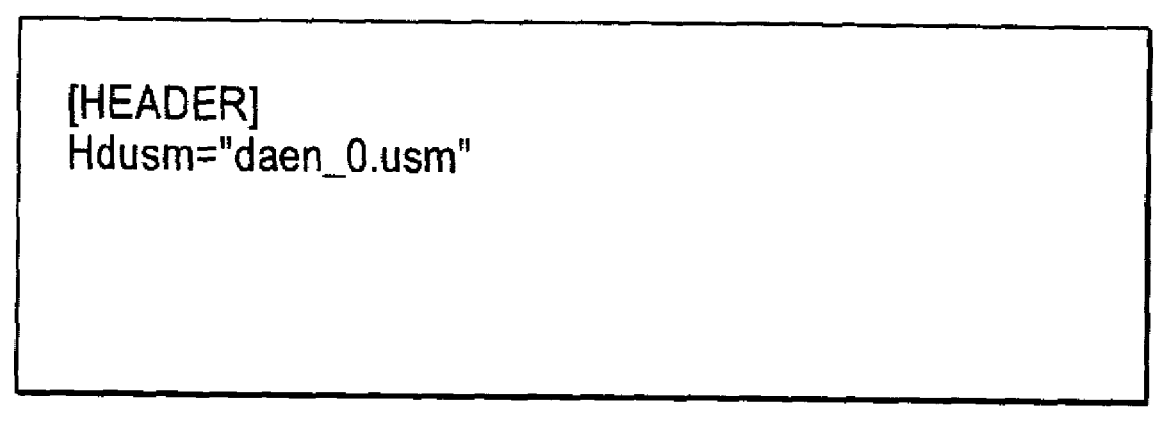

FIG. 8 is a drawing to show the description contents of 0001.ust as a second associating file. In the figure, "Hdusm=" represents a line on which information to specify the first associating file is described, followed by description of the path information of the first associating file as the information to specify the first associating file.

The subject image and the layout definition data group may be associated with each other, for example, as information to associate them with each other is stored in the file of the subject image or, for example, as they are stored in the same folder.

Figure 9:
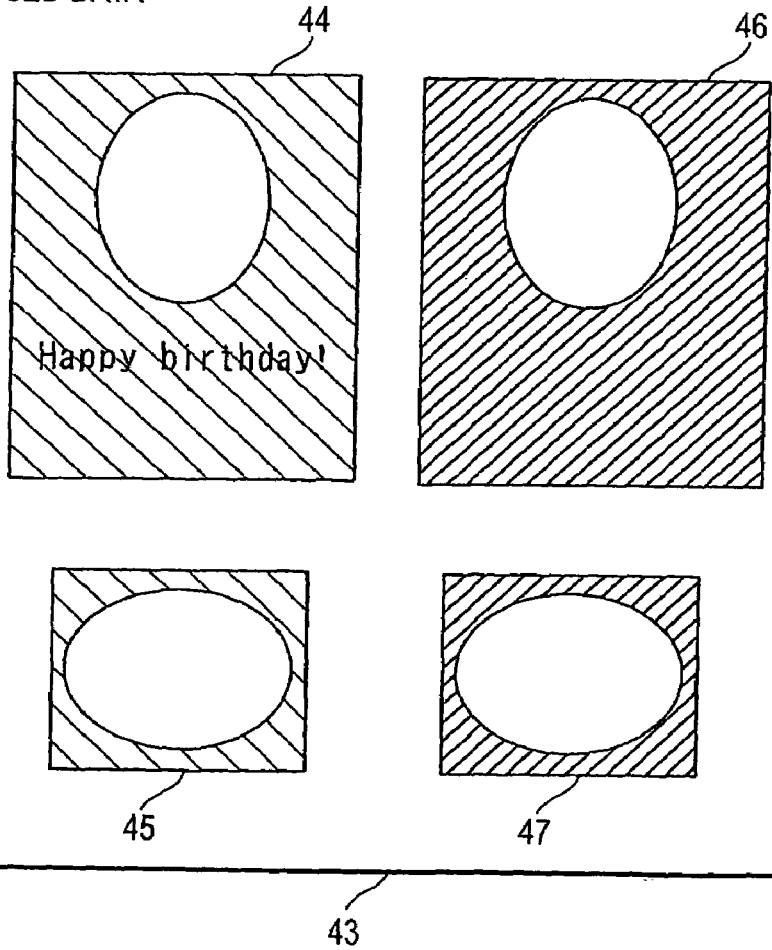
FIG. 9 is a schematic drawing to show the contents of a camera thumbnail according to the invention.

FIG. 9 is a schematic drawing to show the contents of a camera thumbnail 43. The camera thumbnail 43 stores a digital still image (whole thumbnail) 44 for representing the whole of the layout defined in the layout definition data 41 and a digital still image (partial thumbnail) 45 for representing the part of the default image to be superposed on the subject image. The camera thumbnail 43 also stores an α channel 46 for combining the whole thumbnail 44 and the subject image into one for display and an α channel 47 for combining the partial thumbnail 45 and the subject image into one for display. Preferably, the whole thumbnail 44, the partial thumbnail 45, and the α channels 46 and 47 are compressed in a data format such as JPEG. Further, the camera thumbnail 43 stores information to define the orientation of the whole thumbnail 44 (for example, "portrait"), information to define the frame for placing the subject image (for example, upper right coordinates of the frame "(x1, y1)" and lower left coordinates of the frame "(x2, y2)"), information to define the orientation of the frame for placing the subject image (for example, "portrait"), etc., as subordinate information.

FIG. 10 is a schematic drawing to describe a print job. Information such as the path information of the subject image, the number of print sheets of the subject image, the paper size, print at the photographing time executed/not executed, frame processing executed/not executed, and print mode is specified for the print job.

Figure 11:
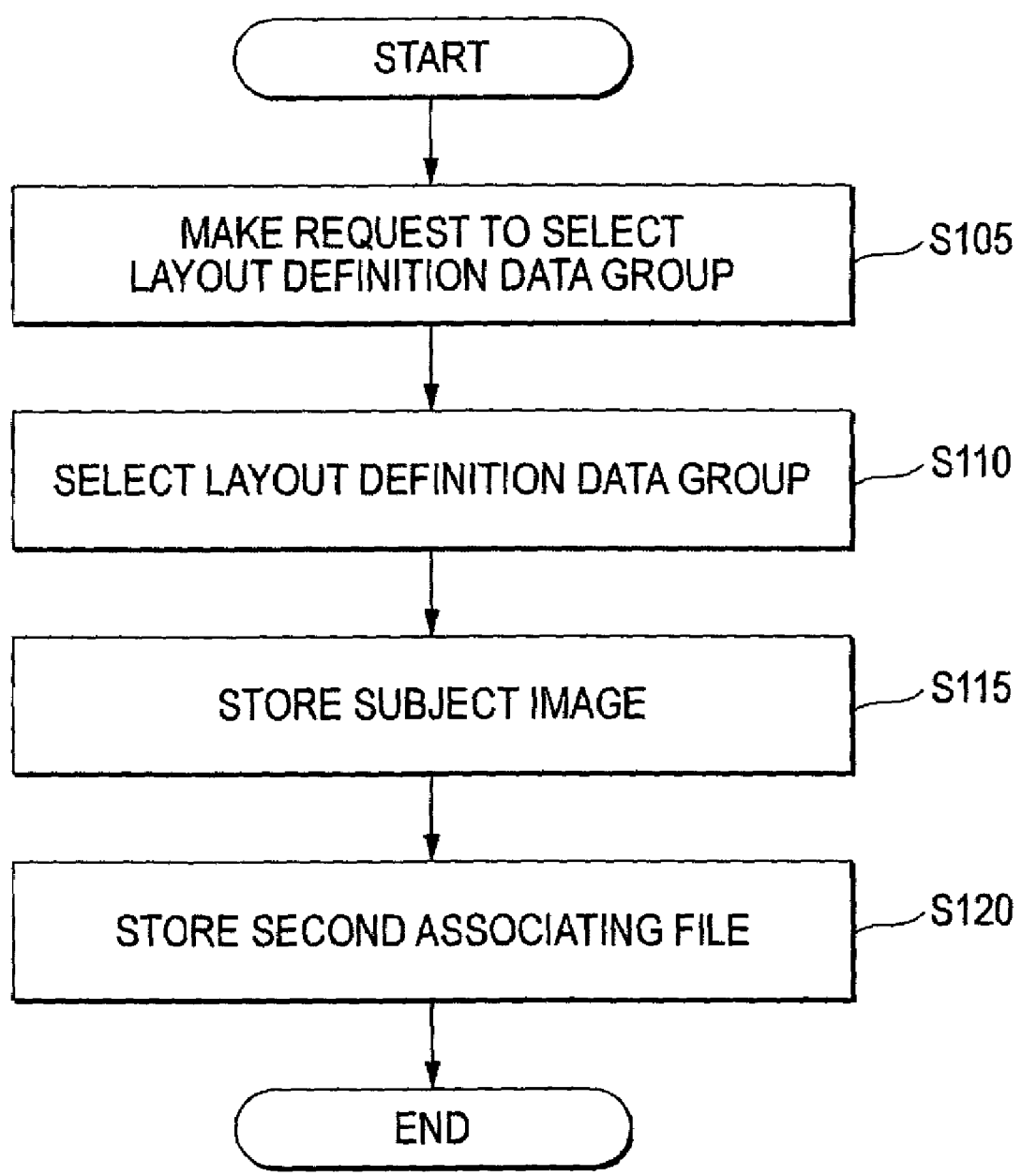
FIG. 11 is a flowchart to show storage processing of a subject image according to the invention.
Figure 12:
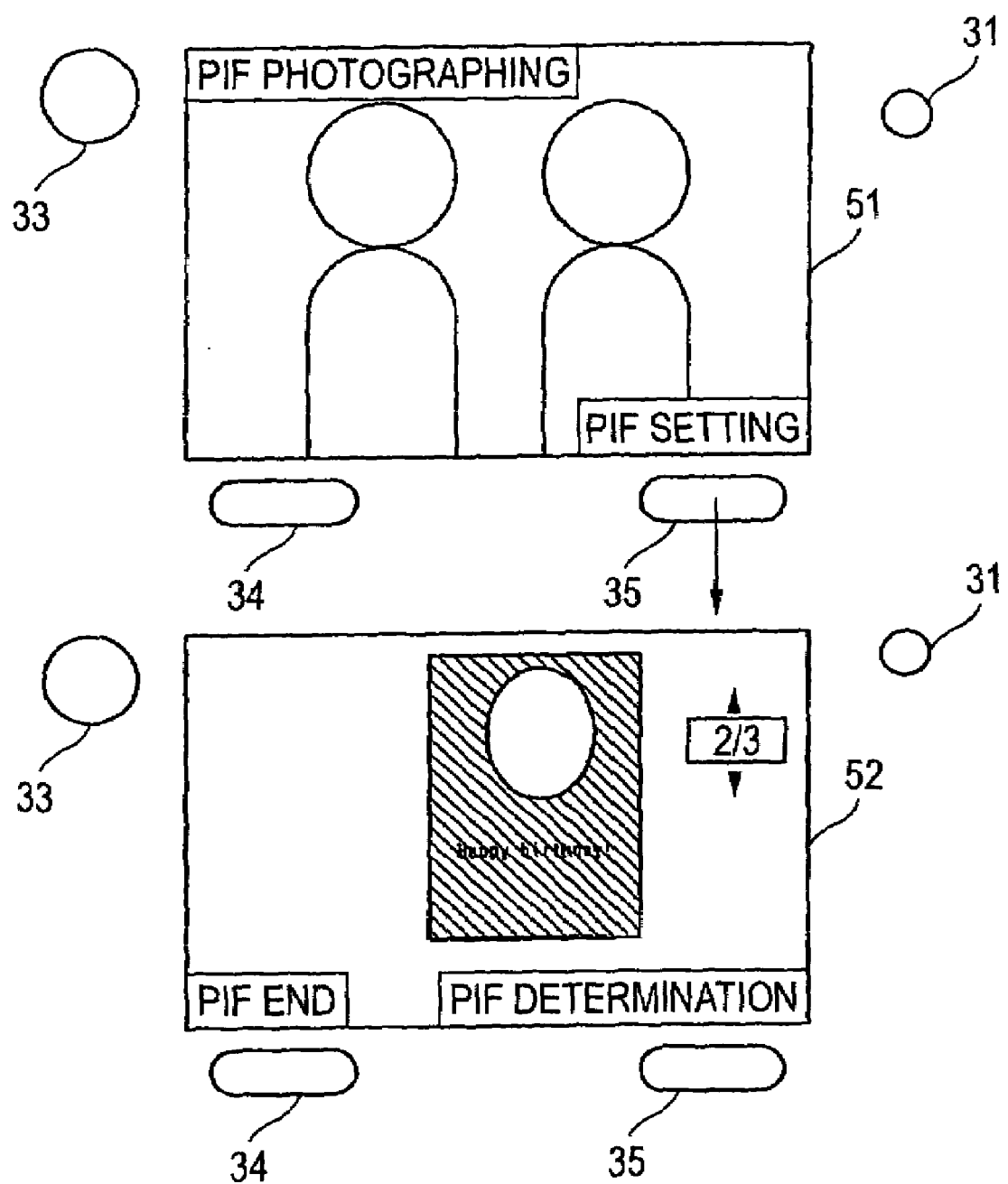
FIG. 12 is a screen transition drawing in the storage processing of a subject image according to the invention.

FIG. 11 is a flowchart to show a flow of storage processing of a subject image in the removable memory 18. FIG. 12 is a schematic drawing to show screen transition of the LCD 24. The processing shown in FIG. 11 is started as the pushbutton switch 31 is pushed in the photographing mode, and proceeds as the CPU 19 executes a predetermined program stored in the ROM 20. That is, the CPU 19 functions as layout selection means and record means by executing the predetermined program stored in the ROM 20.

At step S105, a screen 51 for making a request to select a layout definition data group is displayed. The user pushes the pushbutton switch 35 on the screen 51, thereby making a request to select.

At step S110, the digital still camera detects the user pressing the pushbutton switch 35 and displays the whole thumbnail 44 corresponding to the currently selected layout definition data group as on a screen 52 in FIG. 12. Any one first associating file is selected, whereby a layout can be selected without specifying the paper size. Accordingly, if a plurality of layout definition data groups exist, the layout definition data group with which the subject image is to be associated for storage can be selected. Specifically, since the name of the folder in which the camera thumbnail is stored and the first associating file are given a common name (for example, "daen_0"), the file name of the first associating file is selected, whereby both the layout definition data group and the camera thumbnail can be selected. A search is made for the whole thumbnail 44 corresponding to the selected layout definition data group based on the file name of the first associating file and the whole thumbnail 44 is stored in the frame buffer of the display controller 23 and is displayed on the LCD 24. After selecting the first associating file, the user presses the shutter switch 30 to enter an output command of the subject image.

At step S115, the shutter switch 30 being pressed is detected and the subject image output from the image formation section 15 and compressed by the compression-decompression section 16 is stored in the removable memory 18 by the memory controller 17.

At step S120, a second associating file describing the path information of the first associating file to specify the currently selected layout definition data group is created and is given a filename including the same character string as the subject image and is stored in the folder. Consequently, the subject image is stored in the removable memory 18 in association with the currently selected layout definition data group.

Figure 13:
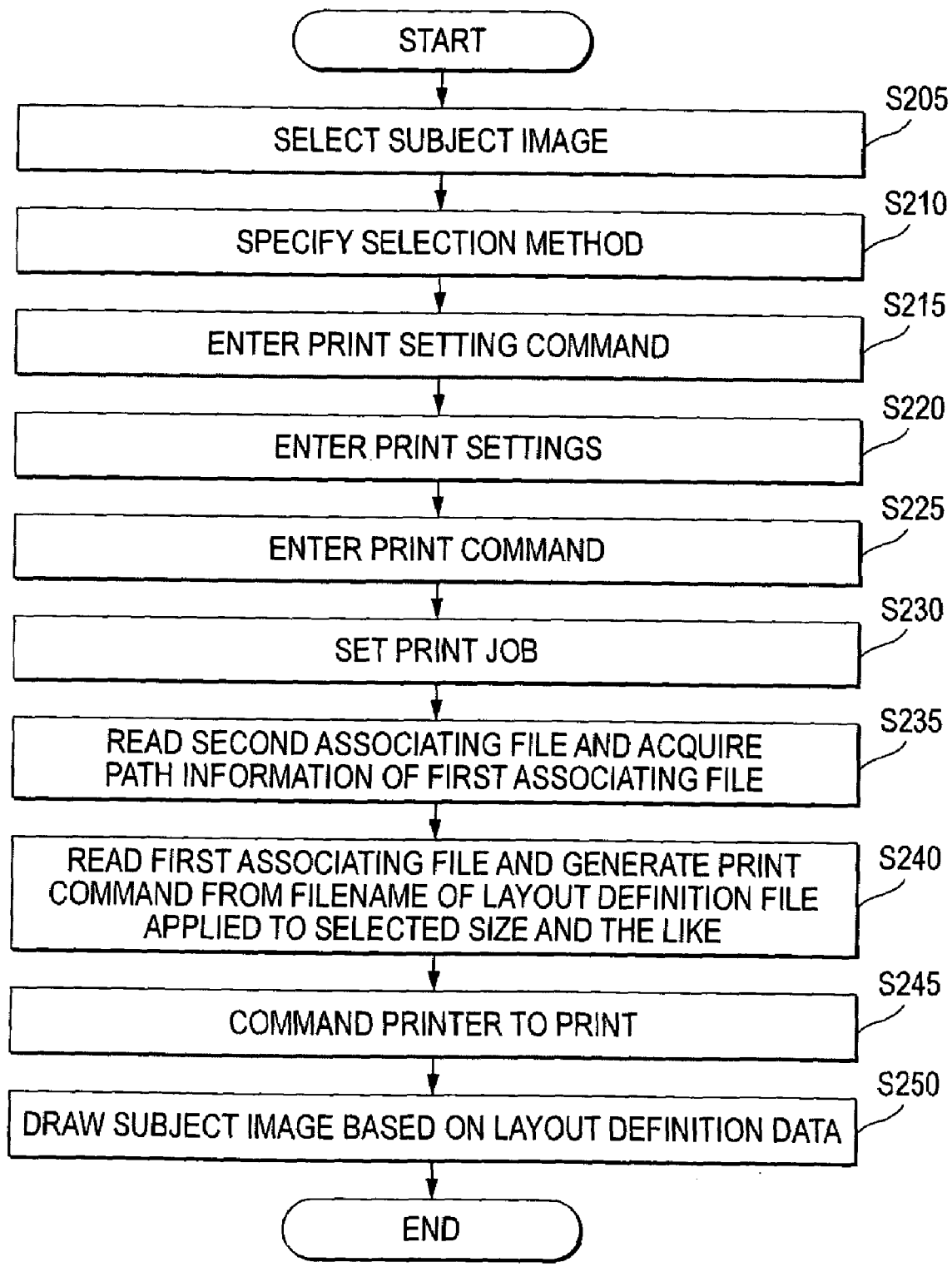
FIG. 13 is a flowchart to show print processing of a subject image according to the invention.
Figure 14:
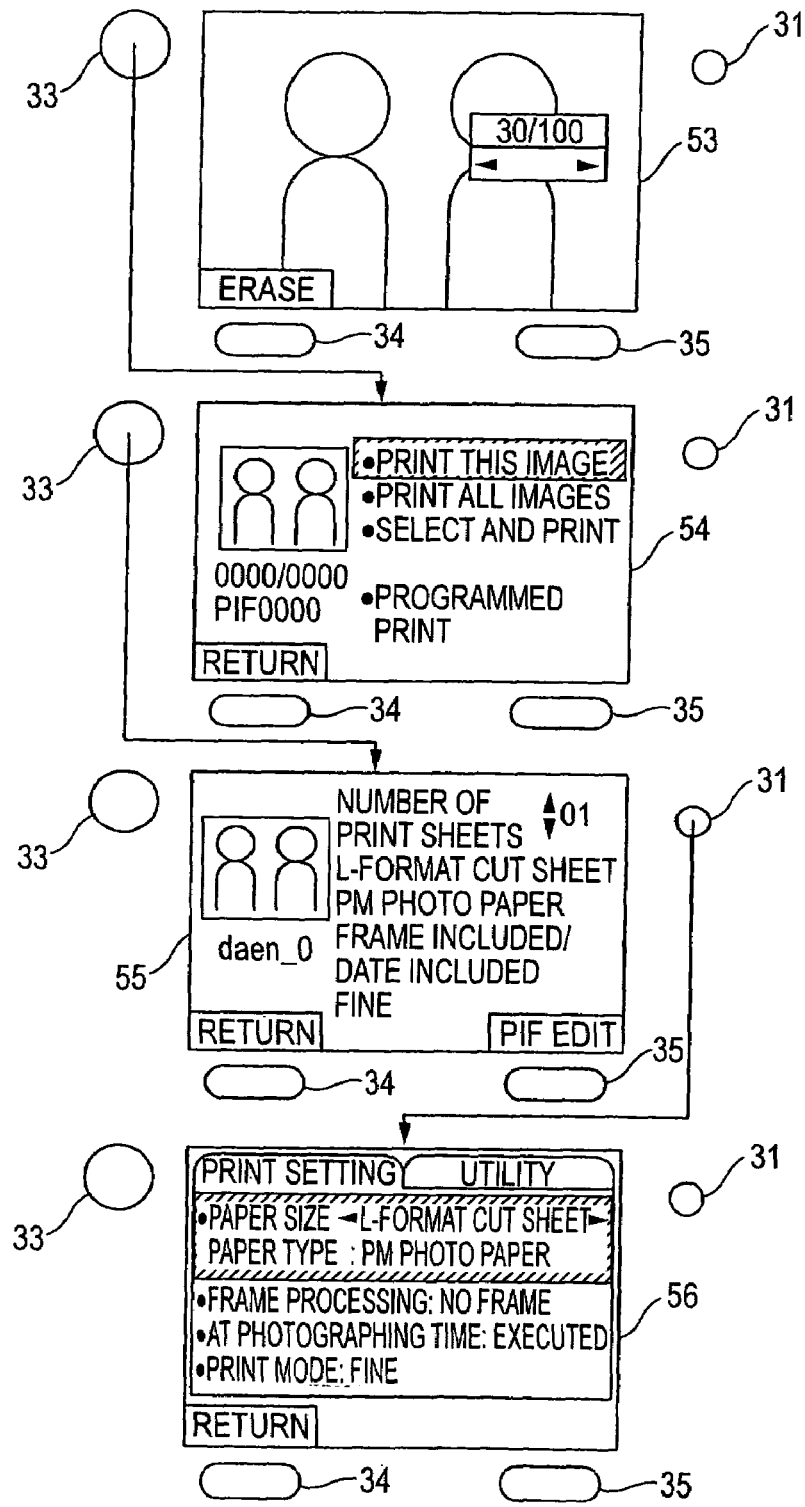
FIG. 14 is a screen transition drawing in the print processing of a subject image according to the invention.

FIG. 13 is a flowchart to show a processing flow of causing the printer 2 to print a subject image. FIG. 14 is a schematic drawing to show screen transition of the LCD 24. The processing shown in FIG. 13 is started when the print mode is selected, and proceeds as the CPU 19 executes a predetermined program stored in the ROM 20. That is, the CPU 19 functions as print setting means and print control means by executing the predetermined program stored in the ROM 20.

At step S205, a screen 53 for selecting the subject image to be printed is displayed. The user can press the left or right of the cross key 32 to display the stored subject images in order for selecting one of the subject images. If the pushbutton switch 33 is pushed in a state in which the subject image to be printed is displayed, the process goes to S210.

At S210, a screen 54 for specifying a selection method of the subject image to be drawn is displayed. The screen 54 displays three options of "print this image," "print all images," and "select and print" as options to specify a selection method, and the user selects any one from among them with the cross key 32. If "print this image" is selected, the subject image displayed when the pushbutton switch 33 is pushed on the screen 53 is to be printed. If "print all images" is selected, a plurality of subject images stored in the removable memory 18 are all to be printed. If "select and print" is selected, the subject image to be printed can be selected from among a plurality of subject images stored in the removable memory 18 and a print command can be entered in batch for the selected subject images. Details of "print all images" and "select and print" are omitted. In the description that follows, the case where "print this image" is selected is taken as an example:

At S215, a screen 55 to enter a print setting command and a print command is displayed. If the pushbutton switch 31 is pushed on the screen 55, the process goes to S220.

In the embodiment, if the pushbutton switch 35 is pushed on the screen 55, a transition is made to the screen 52 in FIG. 12 to change associating of a layout definition data group and a subject image with each other. Accordingly, the user can again associate a subject image with a layout definition data group different from the layout definition data group selected when the subject image is output. That is, the default image to be combined with the subject image can be changed after photographing.

At S220, a screen 56 to enter print settings is displayed. The screen 56 displays "paper size" as a menu item to select the size of a drawing medium. The user can move a cursor to "paper size" with the cross key 32 and can press the right or left of the cross key 32, thereby selecting the objective size from among the preset sizes. The preset size refers to the size to which any of the layout definition data pieces making up the layout definition data group associated with the currently selected subject image is applied. For example, assume that the layout definition data pieces making up the layout definition data group are three data pieces of daen0000.usd, daen0001.usd, and daen0002.usd, which define the layouts for drawing media of the sizes of "A4," "L-format cut sheet," and "postcard" respectively. In this case, only "A4," "L-format cut sheet," and "postcard" are displayed as the options. The screen 56 also displays menu items to select frame processing and the image quality in addition to the paper size. Details of the menu items are omitted. If the pushbutton switch 34 is pressed after settings, the process goes to S225.

At S225, again the screen 55 is displayed and the user pushes the pushbutton switch 33 to enter a print command.

At S230, the digital still camera 1 detects the user pressing the pushbutton switch 33 and sets a print job from the path information of the subject image, the number of print sheets, the paper size, etc.

At S235, the second associating file containing the same character string as the filename of the subject image specified by the path information contained in the print job is read from the removable memory 18 and the path information of the first associating file is acquired from the second associating file.

At S240, the layout definition data pieces making up the layout definition data group with which the subject image is associated are determined according to the first associating file determined by the acquired path information and a print command shown in FIG. 15 is generated from the path information of the layout definition data piece defining the layout for the size set in the print job from among the determined layout definition data pieces and the print job. As shown in the figure, the print command contains the path information of the layout definition data in addition to the information contained in the print job. At this time, the CPU 19 determines the layout definition data applied to the setup size by the character string included in the filename of the layout definition data. For example, if L-format cut sheet is selected, the path information of the layout definition data with the filename including "1" in the eighth character thereof is set in the print command.

At S245, the generated print command is output to the printer 2 for commanding the printer to print.

At S250, the printer 2 reads the subject image and the layout definition data from the digital still camera 1 based on the output print command, interprets the layout definition data, combines the default image with the subject image according to the layout defined in the layout definition data, and generates raster data from the composite image. Next, the printer prints the generated raster data on print paper of the size set in the print command. Accordingly, the subject image is drawn on the drawing medium.

According to the digital still camera 1 according to the embodiment of the invention described above, the output subject image is associated with the layout definition data group. Therefore, as the associating is changed, the default image to be combined with the subject image can be changed. Since the subject image is associated with the layout definition data group, the size of a drawing medium is not specified and when the subject image is drawn, the size can be selected. Thus, according to the digital still camera 1, the subject image can be stored so that the default image to be combined with the subject image can be changed after the subject image is photographed, and that the size of a drawing medium to draw the composite image provided by combining the default image with the subject image can be selected after the subject image is photographed.

The embodiment has been described by taking the case where the print job is set in the digital still camera 1 as an example. However, the printer 2 may be provided with a reader for reading the removable memory 18 and the digital still camera 1 may execute up to storing of the subject image the removable memory 18 and the printer 2 may set a print job and control print, etc.

The print system may be made up of the digital still camera 1, the printer 2, and a personal computer.

The embodiment has been described by taking the digital still camera as an example, but the invention may be applied to a digital video camera.

What is claimed is:

1. A digital camera comprising:
an optical system for forming an optical image of a subject;
an image pickup unit that converts the formed optical image of the subject and outputs a subject image; and
a recording unit that associates the subject image output by the image pickup unit with a layout definition data group and stores the subject image in a nonvolatile memory,
wherein the layout definition data group includes first definition data and second definition data,
wherein the first definition data define a first layout to draw the subject image for a first medium,
wherein the second definition data define a second layout, which is different from the first layout in scale, to draw the subject image for a second medium, which is different from the first medium in size,
wherein the first definition data and the second definition data, which are included in the layout definition data group, are associated with first information, respectively,
wherein the first information is associated with second information, wherein the subject image includes a first image and a second image being different from the first image, wherein the recording unit stores the second information in the nonvolatile memory and associates the second information with each of the first image and the second image so that the first image and the second image are associated with the layout definition data group, respectively, and wherein, if the first image and the second image are selected by a user and one operation for selecting one of the first medium and the second medium is input by the user, then:

the second information which is associated with each of the first image and the second image is read from the nonvolatile memory, the first information is specified by the second information, one of the first definition data and the second definition data which defines a corresponding one of the first layout and the second layout to draw the first image and the second image for the selected one of the first medium and the second medium is specified by the first information, and a command for printing the first image and the second image on the selected one of the first medium and the second medium based on the specified one of the first definition data and the second definition data is generated.

2. The digital camera according to claim 1, wherein the recording unit includes an identical character string in a filename of the subject image and a filename of the second information, thereby associating the subject image with the second associating information.

3. The digital camera according to claim 1, wherein a filename of the first definition data includes a character string from which a size of the first medium can be determined.

4. The digital camera according to claim 1, further comprising a layout selection unit that selects the layout definition data group to be associated with the first image, wherein the layout selection unit causes the first information to be selected, thereby causing the layout definition data group to be selected, and wherein the recording unit associates the first image with the first information selected through the layout selection unit and stores the first image and the first information.

5. A computer-readable medium comprising a data structure executable by a computer for drawing a subject image which includes a first image and a second image being different from the first image, the data structure comprising:

a layout definition data group including first definition data and second definition data;

a first information associated with the first definition data and the second definition data, respectively; and a second information associated with the first information;

wherein the first definition data define a first layout to draw the subject image for a first medium, wherein the second definition data define a second layout, which is different from the first layout in scale, to draw the subject image for a second medium, which is different from the first medium in size, and wherein, if the first image and the second image are selected by a user and one operation for selecting one of the first medium and the second medium is input by the user, then:

the second information which is associated with each of the first image and the second image is specified, the first information is specified by the second information, one of the first definition data and the second definition data which defines a corresponding one of the first layout and the second layout to draw the first image and the second image for the selected one of the first medium and the second medium is specified by the first information, and a command for printing the first image and the second image on the selected one of the first medium and the second medium based on the specified one of the first definition data and the second definition data is generated.

* * * * *